United States Patent
Wallis

[19]

[11] Patent Number: 6,164,334

[45] Date of Patent: Dec. 26, 2000

[54] REED VALVE RETENTION

[75] Inventor: Frank S. Wallis, Sidney, Ohio

[73] Assignee: Copeland Corporation, Sidney, Ohio

[21] Appl. No.: 09/300,674

[22] Filed: Apr. 27, 1999

[51] Int. Cl.$^7$ ..................................................... F16K 15/16
[52] U.S. Cl. .............. 137/856; 137/543.19; 137/852.855
[58] Field of Search ..................................... 137/855, 856, 137/857, 858, 540, 543.19; 417/567, 571

[56] References Cited

U.S. PATENT DOCUMENTS

| | | |
|---|---|---|
| 4,193,424 | 3/1980 | Hrabal . |
| 4,368,755 | 1/1983 | King . |
| 4,445,534 | 5/1984 | King . |
| 4,469,126 | 9/1984 | Simpson . |
| 4,470,774 | 9/1984 | Chambers . |
| 4,478,243 | 10/1984 | King . |
| 4,543,989 | 10/1985 | Lorson . |
| 4,548,234 | 10/1985 | Prenger . |
| 4,642,037 | 2/1987 | Fritchman . |
| 4,643,139 | 2/1987 | Hargreaves . |
| 4,696,263 | 9/1987 | Boyesen . |
| 4,729,402 | 3/1988 | Blass et al. . |
| 4,875,503 | 10/1989 | Heger et al. . |
| 5,192,200 | 3/1993 | Lilie et al. . |
| 5,213,125 | 5/1993 | Leu . |
| 5,277,556 | 1/1994 | van Lintel . |

*Primary Examiner*—Gregory L. Huson
*Assistant Examiner*—Ramesh Krishnamurthy
*Attorney, Agent, or Firm*—Harness, Dickey & Pierce, P.L.C.

[57] ABSTRACT

A valve assembly has a discharge valve member and a suction valve member. One of these valve members includes a reed valve. The reed valve has a tab which is secured to the valve plate by drive studs prior to assembly of the valve assembly to the compressor. The drive studs include a first set of ridges along the shank of the stud to create an interference with the bore in the valve plate. This eliminates the need to access both sides of the stud to secure the stud. The drive studs included a second set of ridges on the surface of the head which contacts the reed valve. A portion of these ridges extend into the mounting hole in the reed valve and a portion of these ridges are compressed during assembly of the stud. These second set of ridges permit the correct positioning of the reed valve to eliminate build tolerances and the retention of this properly positioned reed valve during assembly of the valve assembly to the compressor.

18 Claims, 2 Drawing Sheets

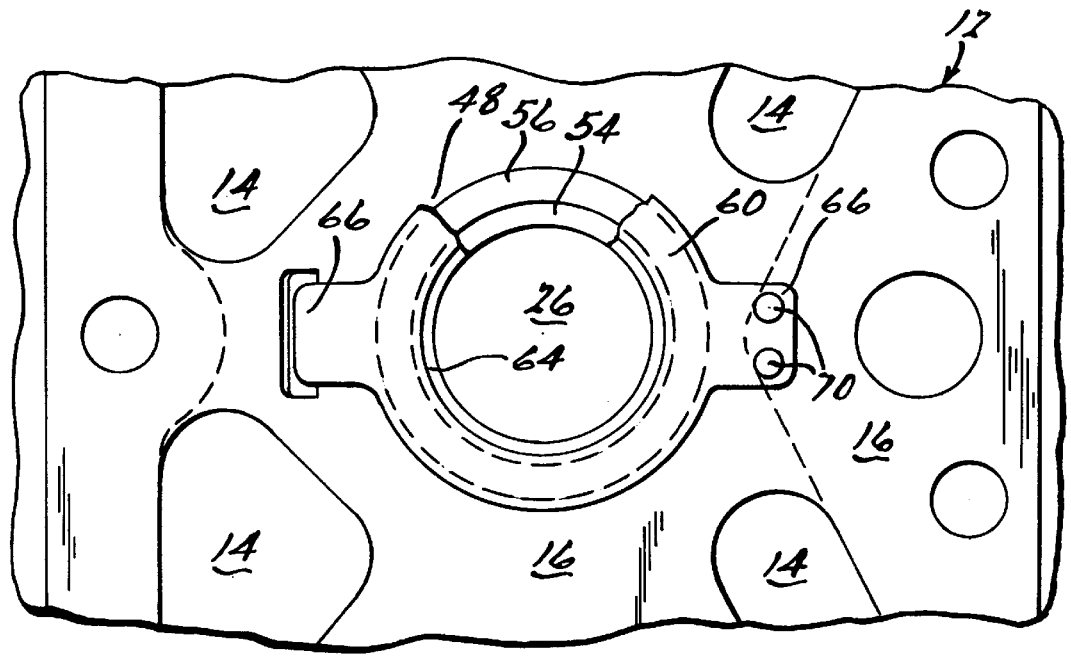
FIG. 2.
FIG. 3.
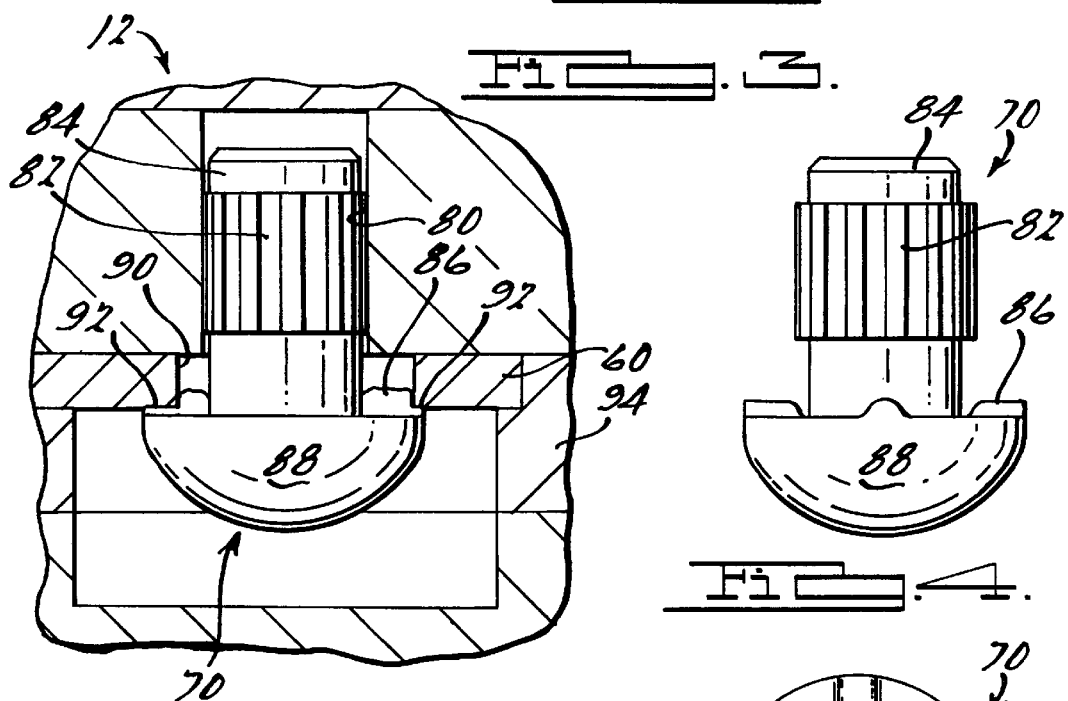
FIG. 4.
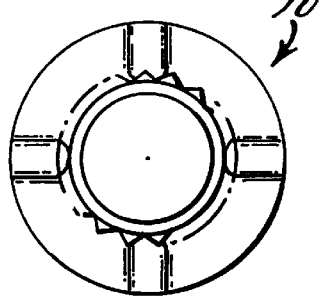
FIG. 5.

6,164,334

REED VALVE RETENTION

FIELD OF THE INVENTION

The present invention relates generally to pressure responsive valve assemblies. More particularly, the present invention relates to valve assemblies which have a reed valve secured to the valve head by a rivet. The valve assemblies are adapted for use in reciprocating piston type compressors, such as refrigerant type compressors.

BACKGROUND AND SUMMARY OF THE INVENTION

Reciprocating piston type compressors typically employ suction and discharge pressure actuated valving mounted at the end of the cylinder housing. When designing these valve assemblies, it is of critical importance to overall system operation to provide a sufficiently large port area to permit the flow of a maximum amount of fluid within a given time period and at an acceptably small pressure drop. This is particularly true for refrigeration compressors employed in air conditioning systems because of the relatively high mass flow rates generally required in such systems.

Associated and conflicting with the desirability to maximize port area of a given size cylinder is the need to reduce the weight of the moving valve member. The reduction of the weight of the moving valve member will lead to a limitation of the inertial effect of the valve and a minimization of the noise level associated with the opening and closing of the valve.

Another important design objective is to minimize the re-expansion or clearance volume of the cylinder. The valving system and the cylinder top end wall should have a shape which is complimentary with the shape of the piston to enable the piston to reduce the volume of the compression chamber to a minimum when the piston is at top dead center of its stroke without restricting gas flow. While it may be possible to accomplish this objective by designing a complex piston head shape, manufacturing of this complex shape becomes excessively expensive, the assembly becomes more difficult and throttling losses generally occur as the piston approaches top dead center. Reduction of the re-expansion volume is of great importance in refrigeration compressors having relatively low mass flow rates, such as those units employed in very low temperature refrigeration systems, as well as in compressors used in heat pump applications.

A typical prior art valve assembly which has been developed to meet the above defined design criteria and solve some of the problems associated with the design of valve assemblies is shown in Applicants' Assignee's U.S. Pat. No. 4,470,774.

The valve assemblies disclosed in the aforesaid U.S. Pat. No. 4,470,774 and particularly the suction valve insert in the form of an annular ring have performed satisfactorily in prior art compressor assemblies. These prior art compressor assemblies used a chlorofluorocarbon (CFC) refrigerant or a hydrochlorofluorocarbon (HCFC) refrigerant. The lubricating oil for these CFC and HCFC compressors has been a mineral oil based lubricant. The combination of the CFC or HCFC refrigerant and the mineral oil based lubricant provides sufficient cooling and lubrication for the insert in these prior art compressors. CFC and HCFC refrigerants are being phased out in refrigerant compressors due to the well known problems associated with the ozone layer. One refrigerant which is being utilized to replace the CFC and HCFC refrigerant is a hydrofluorocarbon (HFC) refrigerant.

HFC refrigerants do not have an adverse affect on the ozone layer and they are quickly becoming the choice of refrigerant to replace the CFC and HCFC refrigerants. When using HFC refrigerants, the mineral oil based lubricants lose some of their effectiveness and they need to be replaced with alternate and more effective lubricating oils. One lubricant which has shown to be compatible with and effective with HFC refrigerants is a polyester based lubricant. While the polyester based lubricants have proven to be a suitable replacement for the mineral oil based lubricants when using HFC refrigerants, there has always been the need to improve and extend the durability of the reciprocating piston designs of compressors.

One component which is being continuously improved is the reed valves associated with the discharge and suction valves of the compressor. The present invention provides the art with a reed valve which is secured to the valve plate by a pair of rivets. The rivets secure the reed valve in position during the assembly of the compressor. Once assembled, the compression of the reed valve between the gasket and the valve plate helps to maintain the position of the reed valve during operation of the compressor.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 2 is a bottom plan view (from inside the cylinder chamber) of the valve assembly shown in FIG. 1;

FIG. 3 is an enlarged cross sectional view of the riveting for the reed valve of the valve assembly shown in FIG. 1;

FIG. 4 is a side view of the rivet shown in FIG. 1 prior to being installed; and FIG. 5 is an end view of the rivet shown in FIG. 4.

DETAILED DESCRIPTION OF THE PREFERRED EMBODIMENT

Figure 1:
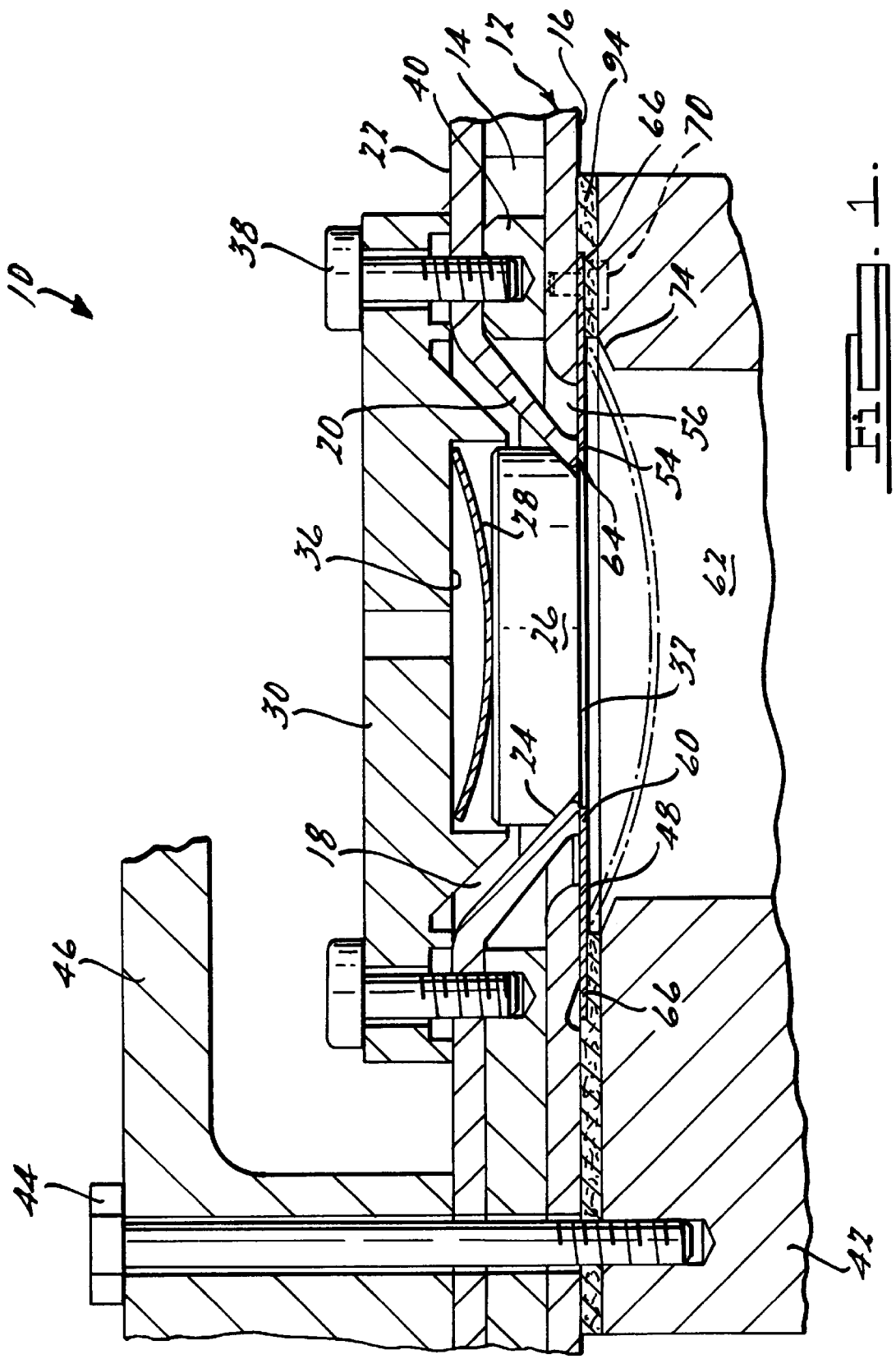
FIG. 1 is a sectional view of a valve assembly incorporating a riveted reed valve in accordance with the present invention.

Referring now to the drawings in which like reference numerals designate like or corresponding parts throughout the several views, there is illustrated in FIGS. 1 and 2, a valve assembly in accordance with the present invention which is indicated generally by the reference numeral 10. Valve assembly 10 comprises a valve plate assembly 12 having a relatively large irregularly shaped generally annular recessed portion or suction chamber 14 extending into the lower surface 16 thereof. A discharge chamber 18 of frusto conical shape is also provided, being defined by a radially inwardly inclined or beveled sidewall 20 extending between an upper surface 22 and lower surface 16 of valve plate assembly 12. A surface 24 of sidewall 20 provides a valve seat for a discharge valve member 26 which is urged in to sealing engagement therewith by gas pressure and a spring 28 extending between valve member 26 and a bridge-like retainer 30.

As shown, discharge valve member 26 is of a size and shape relative to discharge chamber 18 so as to place a lower surface 32 thereof in substantially coplanar relationship to lower surface 16 of valve plate assembly 12. Spring 28 is located in a recess 36 provided in retainer 30. Discharge valve member 26 is essentially pressure actuated and spring 28 is chosen primarily to provide stability and also an initial closing bias or preload to establish an initial seal. Other types of springs, other than springs may of course be used for this purpose. Retainer 30, which also serves as a stop to limit the opening movement of valve member 26 is secured to valve plate assembly 12 by a pair of suitable fasteners 38.

A generally annular valve plate insert 40 is disposed within recessed suction chamber 14 into which fasteners 38 extend so as to secure retainer 30. Valve plate assembly 12 is secured to a cylinder housing 42 using a plurality of bolts 44 which extend through a valve cover 46, through valve plate assembly 12 and are threadingly received within cylinder housing 42. A plurality of spaced cutout areas or radially extending slots (not shown) are provided through valve plate insert 40 so as to allow suction fluid flow between radially inner and outer sides thereof.

Valve plate assembly 12 defines an annular valve seat 48 and sidewall 20 defines an annular valve seat 54 at its terminal end. Disposed between valve seat 48 and valve seat 54 is a suction input passage 56.

Valve seat 54 of sidewall 20 is positioned in coplanar relationship with valve seat 48 of valve plate assembly 12. A suction reed valve member 60 in the form of an annular ring sealingly engages, in its closed position, valve seat 54 of sidewall 20 and valve seat 48 of valve plate assembly 12 to prevent passage of fluid from a compression chamber 62 into suction chamber 14 via passage 56. A central opening 64 is provided in suction reed valve member 60 and is arranged coaxially with discharge chamber 18 so as to allow direct fluid flow communication between compression chamber 62 and lower surface 32 of discharge valve member 26. Suction reed valve member 60 also includes a pair of diametrically opposed radially outwardly extending tabs 66. One tab 66 is used to secure reed valve member 60 to valve plate assembly 12 using a pair of drive studs 70 as discussed in greater detail below.

As the reciprocating piston (not shown) disposed within compression chamber 62 moves away from valve assembly 10 during a suction stroke, the pressure differential between compression chamber 62 and suction chamber 14 will cause suction reed valve member 60 to deflect inwardly with respect to compression chamber 62, to its open position, as shown in phantom in FIG. 1, thereby enabling fluid flow from suction chamber 14 into compression chamber 62 through input passage 56 disposed between valve seats 48 and 54. Because only tabs 66 of suction reed valve member 60 extend outwardly beyond the sidewalls of compression chamber 62, suction fluid flow will readily flow into compression chamber 62 around substantially the entire inner and outer peripheries of suction reed valve member 60. As a compression stroke of the piston begins, suction reed valve member 60 will be forced into sealing engagement with valve seat 54 and valve seat 48. Discharge valve member 26 will begin to open due to the pressure within compression chamber 62 exceeding the pressure within discharge chamber 18 and the force exerted by spring 28. The compressed gas will be forced through central opening 64, past discharge valve member 26 and into discharge chamber 18. The concentric arrangement of valve plate assembly 12 and reed valve member 60 allow substantially the entire available surface area overlying compression chamber 62 to be utilized for suction and discharge valving and porting, thereby allowing maximum fluid flow both into and out of compression chamber 62.

The continuous stroking of the piston within compression chamber 62 continuously causes suction reed valve member 60 to move between its open and closed positions. Thus, there is a constant bending or flexing of tabs 66. Cylinder housing 42 includes an angled or curved portion 74 at the outer edge of compression chamber 62 to provide a friendly surface for suction reed valve member 60 to bend against, thereby significantly reducing the bending stresses generated within tabs 66.

The present invention is directed to a unique method for securing one of the two tabs 66 to valve plate assembly by drive studs 70 before valve plate assembly 12 is secured to cylinder housing 42. The attachment method for suction reed valve member 60 of the present invention is shown in greater detail in FIG. 3.

Referring now to FIGS. 3–5, the riveting of reed valve member 60 to valve plate assembly 12 is illustrated. The use of drive studs 70 allows for the positioning and the retention for reed valve member 60 to valve plate assembly 12. Valve plate assembly 12 defines a pair of stud bores 80 into which drive studs 70 are assembled. In a prior art compressor, rivets are used in place of drive studs 70. Accessibility to both ends of the rivet are required in order to squeeze the rivet axially to form the "shop head" which swells and thus anchors the rivet. These prior art rivets hold a reed to the valve plate by a combination of the swelling of the rivet shank and the friction from the rivet head which is a result of tension in the shank from the squeeze operation. Drive studs 70 of the present invention do not have to be squeezed and thus accessibility to both ends of drive studs 70 is not required. The positioning and retention of reed valve member 60 is the result of a plurality of axially extending flutes or ridges 82 on a shank 84 of stud 70 and a plurality of a plurality of radially extending nibs or ridges 86 on a head 88 of stud 70. Drive studs 70 are pressed into bores 80 and remain in place due to a mechanical interference between the inside diameter of bore 80 and the outside diameter of flutes or ridges 82. As an alternative, ridges 82 can be eliminated and an interference fit can be designed between bore 80 and drive stud 70 if desired. The resulting tension forces available to hold reed valve member 60 in place due to head friction are thus not available with drive studs 70 due to the fact that swelling does not take place since drive studs 70 are not squeezed. Nibs or ridges 86 have been incorporated to replace and improve the retention of reed valve member 60.

Positioning of reed valve member 60 with respect to valve plate assembly 12 is critical to the overall operation of the compressor. The variation of its position relative to valve plate assembly 12 is due to the manufacturing tolerances in the various components used to make up valve plate assembly 12. The variations due to manufacturing tolerances typically results in a bore 90 extending through reed valve member 60 not being in perfect alignment or concentric with bores 80 when reed valve member 60 is properly positioned with respect to valve plate assembly 12. One method of compensating for tolerance stack up is to make bores 90 oversize or larger than bore 80 as illustrated in FIG. 3.

Nibs or ridges 86 are incorporated to overcome the use of oversize bores 90. When stud 70 is inserted through bore 90 and into bore 80, nibs 86 are crushed where they contact reed valve member 60 as shown at 92 in FIG. 3. The uncrushed portion of nibs 86 or the portion of nibs 86 that enter bore 90 lock reed valve member 60 in place preventing lateral motion. Once valve plate assembly 12 is assembled to cylinder housing 42, the compression of a gasket 94 can be relied upon for primary retention of reed valve member 60. The use of gasket compression for primary retention of reed valve member 60 negates the requirement for a tight drive stud during compressor operation. Thus, only minimal frictional retention force between drive studs 70 and bore 80 will hold reed valve member 60 in position during assembly of the compressor.

While the above detailed description describes the preferred embodiment of the present invention, it should be understood that the present invention is susceptible to modification, variation and alteration without deviating from the scope and fair meaning of the subjoined claims.

What is claimed is:

1. A pressure responsive valve assembly for a compression chamber, said valve assembly comprising:
    a valve plate defining a discharge chamber and a suction chamber;
    a pressure responsive discharge valve member disposed between said discharge chamber and said compression chamber;
    a pressure responsive suction valve member disposed between said suction chamber and said compression chamber; and
    a drive stud securing said suction valve member to said valve plate, said drive stud including a shank and a head, said head being larger than said shank, said shank extending through a hole in said suction valve member and into a bore defined by said valve plate, said drive stud having an interference fit with respect to said bore, said head engaging said suction valve member to secure said valve member to said valve plate.

2. The pressure responsive valve assembly according to claim 1, wherein said shank has a plurality of flutes, said flutes having said interference fit with respect to said bore.

3. The pressure responsive valve assembly according to claim 2, wherein said shank defines an axis, said plurality of flutes being generally parallel to said axis of said shank.

4. The pressure responsive assembly according to claim 2, wherein said head has a plurality of ridges, at least a portion of said ridges being disposed within said hole in said suction valve member.

5. The pressure responsive valve assembly according to claim 4, wherein said head is generally circular, said plurality of ridges extending radially along a surface of said head.

6. The pressure responsive valve assembly according to claim 2, wherein said hole in said suction valve member is larger than said bore of said valve plate, said head having a plurality of ridges, a first portion of said ridges extending into said hole in said suction valve member, a second suction of said ridges being deformed by engagement with said suction valve member during assembly of said drive stud.

7. The pressure responsive valve assembly according to claim 6, wherein said head is generally circular, said plurality of ridges extending radially along a surface of said head.

8. The pressure responsive assembly according to claim 1, wherein said head has a plurality of ridges, at least a portion of said ridges being disposed within said hole in said suction valve member.

9. The pressure responsive valve assembly according to claim 8, wherein said head is generally circular, said plurality of ridges extending radially along a surface of said head.

10. The pressure responsive valve assembly according to claim 1, wherein said hole in said suction valve member is larger than said bore of said valve plate, said head having a plurality of ridges, a first portion or said ridges extending into said hole in said portion valve member, a second suction of said ridges being deformed by engagement with said suction valve member during assembly of said drive stud.

11. The pressure responsive valve assembly according to claim 10, wherein said head is generally circular, said plurality of ridges extending radially along a surface of said head.

12. The pressure responsive valve assembly according to claim 1, wherein said shank has a plurality of ridges having a specified length, said specified length of ridges having said interference fit with respect to said bore and said specified length of ridges being entirely disposed within said bore.

13. A pressure responsive valve assembly for a compression chamber, said valve assembly comprising:
    a valve plate defining a discharge chamber and a suction chamber;
    a pressure responsive discharge valve member disposed between said discharge chamber and said compression chamber;
    a pressure responsive suction valve member disposed between said suction chamber and said compression chamber; and
    a drive stud securing said suction valve member to said valve plate, said drive stud extending through a hole in said suction valve member and into a bore defined by said valve plate, said drive stud including a head having a plurality of ridges, at least a portion of said ridges being disposed within said hole in said suction valve member plate to secure said valve member to said valve plate.

14. The pressure responsive valve assembly according to claim 13, wherein said drive stud includes a shank having a plurality of flutes, said flutes having an interference fit with respect to said bore.

15. The pressure responsive valve assembly according to claim 14, wherein said shank defines an axis, said plurality of flutes being generally parallel to said axis of said shank.

16. The pressure responsive valve assembly according to claim 13, wherein said head is generally circular, said plurality of ridges extending radially along a surface of said head.

17. The pressure responsive valve assembly according to claim 13, wherein said hole in said suction valve member is larger than said bore of said valve plate, a first portion or said ridges of said drive stud extending into said hole in said suction valve member, a second suction of said ridges of said drive stud being deformed by engagement with said suction valve member during assembly of said drive stud.

18. The pressure responsive valve assembly according to claim 17, wherein said head is generally circular, said plurality of ridges extending radially along a surface of said head.

* * * * *

UNITED STATES PATENT AND TRADEMARK OFFICE
CERTIFICATE OF CORRECTION

PATENT NO. : 6,164,334
DATED : December 26, 2000
INVENTOR(S) : Frank S. Wallis

It is certified that error appears in the above-identified patent and that said Letters Patent is hereby corrected as shown below:

Column 1,
Line 34, "complimentary" should be -- complementary --.
Line 51, "Applicants" should be -- Applicant's --.

Column 6,
Line 4, "or" should be -- of --.
Line 5, "suction" should be -- portion --.
Line 35, after "member" delete -- plate --.
Line 50, "or" should be -- of --.

Signed and Sealed this

Sixteenth Day of October, 2001

Attest:

NICHOLAS P. GODICI
Attesting Officer   Acting Director of the United States Patent and Trademark Office

UNITED STATES PATENT AND TRADEMARK OFFICE
CERTIFICATE OF CORRECTION

PATENT NO. : 6,164,334  
DATED : December 26, 2000  
INVENTOR(S) : Frank S. Wallis Page 1 of 1

It is certified that error appears in the above-identified patent and that said Letters Patent is hereby corrected as shown below:

Column 1,  
Line 34, "complimentary" should be -- complementary --.  
Line 51, "Applicants" should be -- Applicant's --.

Column 6,  
Line 4, "or" should be -- of --.  
Line 5, "suction" should be -- portion --.  
Line 35, after "member" delete -- plate --.  
Line 50, "or" should be -- of --.

Signed and Sealed this

Sixth Day of November, 2001

Attest:

NICHOLAS P. GODICI  
*Attesting Officer*  *Acting Director of the United States Patent and Trademark Office*